United States Patent [19]

Pembleton et al.

[11] 3,950,037
[45] Apr. 13, 1976

[54] BRAKE PROPORTIONING VALVE FOR A MOTOR VEHICLE RESPONSIVE TO BOTH THE RATE OF VEHICLE DECELERATION AND VEHICLE LOAD VARIATION

[75] Inventors: James D. Pembleton, Lathrup Village; Keith C. Pratt, Ann Arbor, both of Mich.

[73] Assignee: Ford Motor Company, Dearborn, Mich.

[22] Filed: May 30, 1974

[21] Appl. No.: 474,508

[52] U.S. Cl. ............... 303/24 F; 188/195; 188/349; 303/6 C; 303/22 R
[51] Int. Cl.² .......................................... B60T 8/26
[58] Field of Search ................ 303/6 C, 6 R, 24, 22; 188/349, 195

[56] References Cited
UNITED STATES PATENTS

| | | | |
|---|---|---|---|
| 3,163,473 | 12/1964 | Stelzer | 303/6 C |
| 3,317,251 | 5/1967 | Hambling et al. | 303/6 C X |
| 3,377,108 | 4/1968 | Eddy | 303/6 C X |
| 3,377,109 | 4/1968 | Scott | 303/6 R X |
| 3,423,936 | 1/1969 | Stelzer | 303/6 C X |
| 3,455,609 | 7/1969 | Bratten | 303/24 C |
| 3,467,440 | 9/1969 | Strien | 188/349 X |
| 3,476,443 | 11/1969 | Bratten et al. | 303/24 C |
| 3,781,063 | 12/1973 | Valpreda | 303/6 C |
| 3,795,424 | 3/1974 | Lewis | 303/24 F X |
| 3,825,303 | 7/1974 | Yabuta | 303/24 C X |

*Primary Examiner*—Trygve M. Blix
*Assistant Examiner*—Douglas C. Butler
*Attorney, Agent, or Firm*—Clifford L. Sadler; Keith L. Zerschling

[57] ABSTRACT

A brake valve for a motor vehicle brake system is interposed in the brake line between the master cylinder and the rear wheel brakes and is constructed to limit the fluid pressure at the rear brakes relative to the pressure at the front brakes during the application of master cylinder pressure. Pressure is limited at the rear brakes for the purpose of balancing the front and rear brakes in accordance with their relative effectiveness. The valve includes an inertia sensor that senses the rate of vehicle deceleration and modulates the pressure ratio between the front and rear brakes accordingly. The valve mechanism with its inertia sensor provides a device for compensating for the amount of load carried by the vehicle which, in turn, affects the relative effectiveness of the front and rear brakes.

1 Claim, 8 Drawing Figures

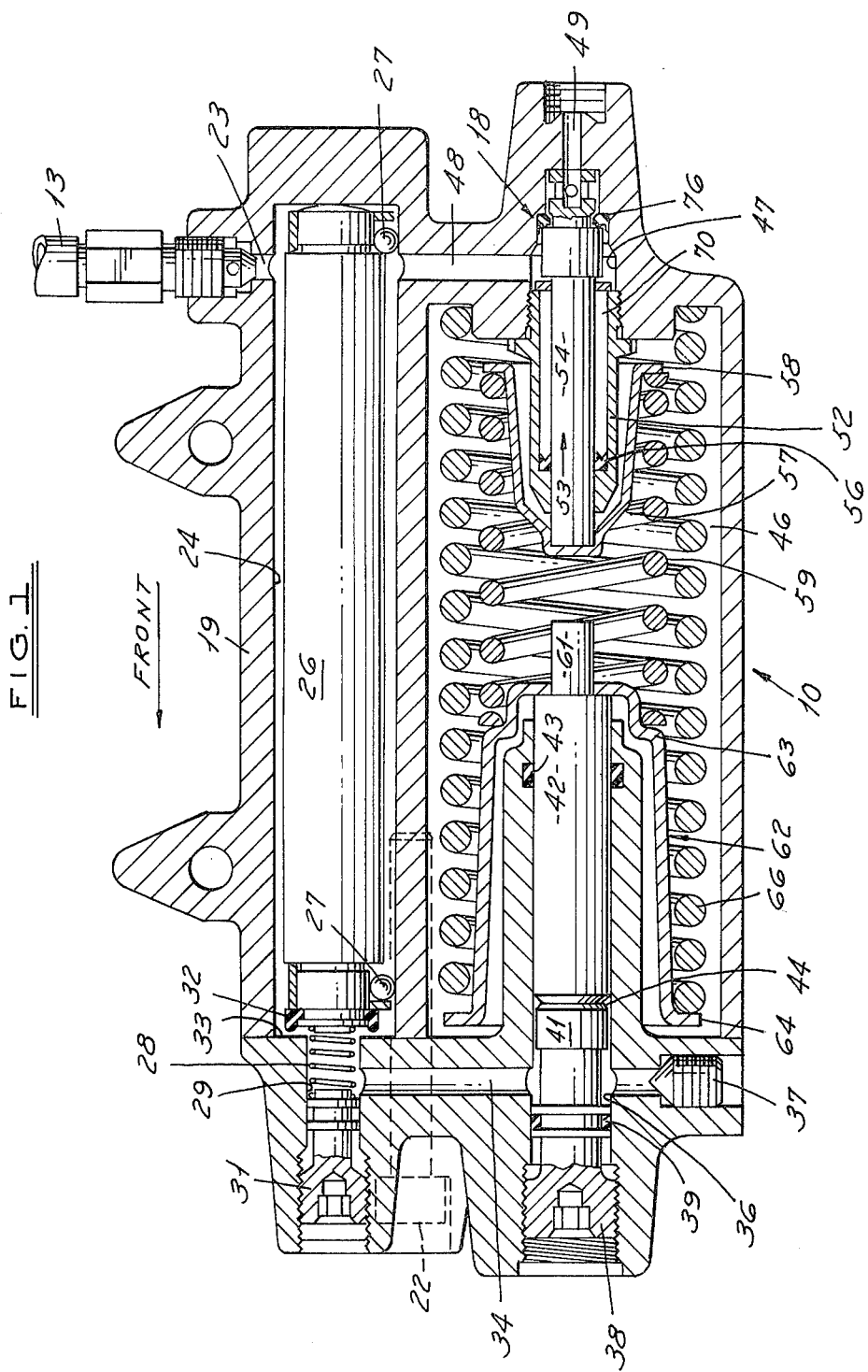

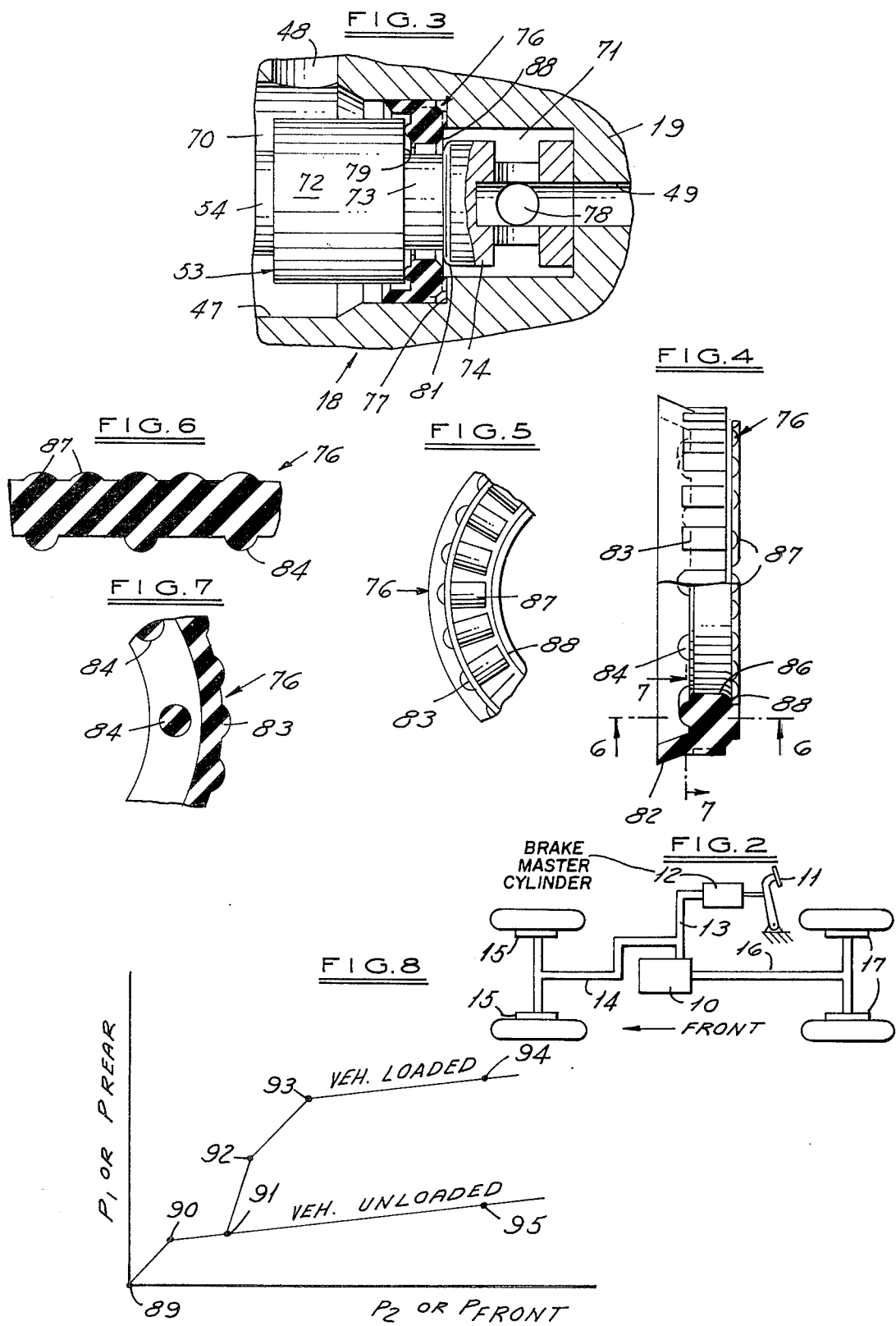

BRAKE PROPORTIONING VALVE FOR A MOTOR VEHICLE RESPONSIVE TO BOTH THE RATE OF VEHICLE DECELERATION AND VEHICLE LOAD VARIATION

BACKGROUND OF THE INVENTION

It is known in the art to provide a pressure proportioning valve in a vehicle brake system having a master cylinder and front and rear wheel brakes. A typical proportioning valve limits the pressurization of the rear brakes relative to the front brakes in response to a master cylinder pressure that exceeds a predetermined minimum. During initial buildup of master cylinder pressure, the front and rear brakes have substantially equal pressure. When the master cylinder pressure exceeds a predetermined minimum, the proportioning valve becomes effective to limit further increases in the pressure at the rear brakes whereby the front-to-rear pressures are at a ratio of less than one-to-one. United States Patent No. 3,423,936 discloses such a proportioning valve.

A pressure proportioning valve interposed in a brake system functions to compensate for differences in the effectiveness of the front and rear brakes. The differences in effectiveness may be due, in part, to differences in the types of brakes employed (for an example, disc brakes on the front wheels and self-energizing drum brakes on the rear wheels) and also, for the dynamic weight shift to the front axle during a brake application. It is the weight shift which produces the principle need for a proportioning valve.

The imbalance between the effectiveness of the front and rear brakes is particularly apparent in a truck and varies substantially depending upon the amount of load which the truck carries. In a fully loaded truck, the weight on the rear axle may be such that the rear brakes having a braking capability that is almost as great as that of the front wheels. When the same truck is in an unladen condition, however, its rear brakes will not be nearly as effective as the front brakes. In such an unladen truck, equal pressure at the front and rear brakes would produce rear wheel skid when the master cylinder pressure is high enough to produce a moderate rate of vehicle deceleration.

A proportioning valve for a passenger automobile brake system is provided with a fixed split point, that is, a fixed point in the buildup of master cylinder pressure at which the proportioning valve becomes effective to limit or retard further increases in pressure at the rear brakes. Because the amount of load carried by a passenger automobile is not substantial in relationship to the total weight of the vehicle, the relative effectiveness of the front and rear brakes is not changed substantially by vehicle load changes. Therefor, a proportioning valve having a fixed split point is acceptable in passenger cars.

In a truck, however, where the relative effectiveness of the front and rear brakes changes greatly depending upon the load on the vehicle, it is desirable to have a proportioning valve with a split point that may be modulated in response to the amount of load and the effectiveness of the brakes. In accordance with the present invention, a proportioning valve is provided having inertia sensitive means for modulating the split point of a brake proportioning valve in response to the rate of vehicle deceleration and master cylinder pressure.

In a vehicle brake system, two inherent conditions exist that are compensated for by the valve of the present invention. These conditions are known as "dead time" and "vehicle lag". Dead time refers to the delay that occurs between initial pressure buildup and brake application at the wheels. During dead time, the brake shoes are moving from an at-rest position into contact with the brake drums. The second condition known as vehicle lag, refers to the delay or lag that occurs between the instant brake pressure is established and the time when the vehicle begins to decelerate. This delay results from the dynamic characteristics of the brake system and the vehicle. It is caused, in part, by elasticity in the brake system such as in the brake lines and in the suspension system which supports the vehicle wheels.

In the presently preferred embodiment of this invention, a brake valve is provided that includes (1) means for proportioning front to rear brake pressures, (2) inertia sensing means for modulating the proportioning function of the valve as a factor of vehicle loading, and (3) means for modifying the operation of the valve to compensate for dead time and vehicle lag.

BRIEF SUMMARY OF THE INVENTION

In the embodiment of the invention disclosed in the drawings, a brake valve includes a spring pressed proportioning valve. The brake valve has an inlet that may be connected to a master cylinder and an outlet that may be connected to a rear wheel brake. The proportioning valve is constructed so that outlet pressures will be equal to the inlet pressure when the inlet pressure is less than a predetermined minimum pressure referred to as the split point. The split point of the proportioning valve is determined, in part, by the force exerted by a proportioning valve spring acting on a valve piston. When inlet pressures are above the split point, the proportioning valve is operative to limit further increases in outlet pressure. With master cylinder pressures above the split point, the rate of increase in outlet pressure will be a fraction of the rate of increase in inlet pressure.

In the illustrated embodiment, a modulating piston is disposed in a chamber normally in communication with inlet pressure. The piston is connected to the spring of the proportioning valve. In response to an increase in inlet pressure, the piston will be displaced and the loading of the proportioning valve spring will be thereby increased. An increase in spring force will cause an increase in the pressure at which the split point occurs.

The spring rate of the proportioning valve spring and the cross sectional area of the modulating piston are designed so that for any given master cylinder pressure between a predetermined minimum and a maximum pressure, the split point will be above the master cylinder pressure and, hence, the proportioning valve will be inoperative insofar as its pressure limiting function is concerned.

The brake valve includes inertia sensing means for limiting the pressure buildup in the chamber behind the modulating piston. An inertia weight that senses vehicle deceleration is arranged to seal the chamber behind the modulating piston when the rate of vehicle deceleration reaches a predetermined amount such as 0.4 G's. When the specified rate of deceleration is realized, the chamber is sealed so that any further increase in master cylinder pressure will not increase the pressure behind the modulating piston and, as a consequence, the modulating piston will not be displaced with respect to the proportioning valve spring. The proportioning valve will, therefore, have a stabilizer split point. Subsequent increases in master cylinder pressure will exceed the stabilizer split point and the proportioning valve will become operative to limit rear brake pressure.

In order to compensate for dead time in the brake system, a second spring engages the modulating piston so that the modulating piston will not move to increase the loading of the proportioning valve spring until after the pressure in the chamber behind the piston has exceeded a predetermined minimum amount necessary to overcome the force of the second spring. Displacement of the modulating piston will not occur to affect the operation of the proportioning valve until after fluid pressure increases in the chamber of the modulating piston by a preset amount over and above the initial split point pressure.

Means are provided in the valve to compensate for vehicle lag. The phenomena of vehicle lag is most noticeable during a spike stop, that is, a stop caused by an application of a high force at a rapid rate to the brake pedal. Compensating for vehicle lag is particularly desirable in an unladen truck in order to avoid rear wheel skid.

In a brake valve that is merely inertia sensitive, a spike stop might cause a pressure increase in the chamber behind the modulating piston that would produce a split point at an excessively high pressure not commensurate with the actual rate of vehicle deceleration due to vehicle lag. With such a condition, a rear wheel skid could be produced. In a proportioning valve in accordance with this invention, initial buildup in inlet pressure does not affect the establishment of the initial split point of the proportioning valve due to the presence of the second spring referred to above. In addition, a restriction is provided in the inlet to the chamber behind the modulating piston. This restriction limits the rate of pressure buildup in the chamber so that the piston will not respond immediately to a surge in inlet pressure. Due to the presence of the restriction, the pressure behind the modulating piston will increase gradually at a controlled rate even in a spike stop situation.

In summary, the present invention provides in its preferred embodiment a brake valve that incorporates a proportioning valve having a split point which may be modulated. The valve includes means for modulating the proportioning valve in response to a buildup of inlet pressure and the rate of vehicle deceleration. The valve includes (1) means for delaying the modulation of the proportioning valve until the buildup of inlet or master cylinder pressure exceeds a predetermined amount in order to compensate for dead time and (2) means for limiting the modulation of the proportioning valve in response to a surge in inlet pressure that precedes a buildup in vehicle deceleration in order to compensate for vehicle lag.

The brake valve of this invention portions the fluid pressure at the front and rear brakes in accordance with the relative effectiveness of those brakes as determined by the rate of vehicle deceleration which, in turn, is dependent upon master cylinder pressure buildup and vehicle loading.

BRIEF DESCRIPTION OF THE DRAWINGS

The many objects and advantages of a brake valve for a motor vehicle brake system that is constructed in accordance with this invention will become apparent upon consideration of the following detailed discussion and the accompanying drawings, in which:

FIG. 1 is a perspective view, partly in section, of an improved brake valve having a pressure proportioning valve;

FIG. 2 is a schematic view of a brake system incorporating the brake valve of FIG. 1;

FIG. 3 is an enlarged view, partly in section, of a portion of the proportioning valve of FIG. 1;

FIG. 4 is an enlarge view, partly in section and partly in elevation, of one of the parts of the proportioning valve illustrated in FIG. 3;

FIG. 5 is an end view of a portion of the valve element illustrated in FIG. 4;

FIG. 6 is a sectional view of the valve element of FIG. 4 taken along section lines 6—6 thereof;

FIG. 7 is a sectional view of a portion of the valve element of FIG. 4 taken along section lines 7—7 thereof; and FIG. 8 is a graph comparing inlet pressure and outlet pressure of the brake valve of FIG. 1 under various conditions of pressure buildup and vehicle loading.

DETAILED DESCRIPTION OF A PREFERRED EMBODIMENT

Referring now to the drawings wherein the presently preferred form of this invention is illustrated, a motor vehicle brake system (see FIG. 2) includes a unique brake valve 10. A brake pedal 11 is linked to a master cylinder 12 which, in turn, is connected by brake lines 13 and 14 to the front brake 15. The brake valve 10 is interposed between rear brake line 16 which is connected to the rear brakes 17 and brake line 13 which is connected to the master cylinder 12.

The brake valve 10 provides a means for regulating the pressure at the rear brakes 17. More particularly, the brake valve 10 includes a proportioning valve assembly 18 and means for modulating the function of the proportioning valve in response to master cylinder pressure and the rate of vehicle deceleration.

The valve assembly 10 has a two-part housing assembly 19, the parts being held together by bolts 22. An inlet port 23 is connected by brake line 13 with the master cylinder 12. The inlet port 23 is in communication with an elongated bore 24. An inertia weight 26 is disposed in the bore 24 and is supported by a pair of caged ball bearings 27. A coil spring 28 is situated in a small diameter bore 29 that connects with the bore 24. The spring 28 is interposed between the end of the inertia weight 26 and a threadedly adjustable spring seat 31. The inertia weight 26 is axially displaceable in the bore 24 and the spring 28 urges the weight to the right.

A rubber valve element 32 is secured to the end of the inertia weight 26 and is normally held in spaced relationship with respect to the shoulder 33 formed at the junction of the bores 24 and 29. The caged ball bearings 27 permits the inertia weight 26 to be displaced to the left in response to an inertia force that exceeds the force of the spring 28. When displaced to the left, the valve element 32 will engage the shoulder 33 and seal the small bore 29 from the bore 24.

A passageway 34 is drilled in the housing assembly 19 at a right angle to the bore 29. The passage 34 intersects with a bore 36 that is arranged at a right angle thereto. A threaded plug 37 seals the drilled passage 34 at its lower end. Similarly, the threaded member 38 seals the left end of the bore 36. The member 38 has a groove which carries on O-ring 39 to affect the seal.

The threaded member 38 has a reduced diameter portion at the junction of the bores 34 and 36 and an enlarged portion 41 disposed to the right of that junction. The enlarged portion 41 has an outside diameter that is only slightly less than the inside diameter of the bore 36. The portion 41 forms a restrictive element that limits fluid flow.

A modulating piston 42 is slidably received in the bore 36. A rubber seal 43 is situated in a groove in the housing and surrounds the piston 42. A modulating pressure chamber 44 is formed between the end of the piston 42 and the end of the restrictive element 41 of the threaded member 38. Restricted fluid communication is provided around the element 41 from the bore 34 to the pressure chamber 44.

The housing 19 has a hollow interior portion 46. A multi-diameter bore 47 is formed in the housing 19 and forms a part of the proportioning valve 18. A drilled passage 48 connects the bore 24 with the bore 47 of the proportioning valve. An outlet passage or port 49 connects the end of the multi-diameter bore 47 with the brake line 16 and the rear brakes 17.

A generally cylindrical member 52 is threaded into the end of the bore 47 and is situated at the right end of the hollow interior portion 46 of the housing 19. A porportioning valve piston 53 has a stem portion 54 that extends lengthwise through the generally cylindrical member 52 and protrudes from its left-hand end. A seal 56 is interposed between the stem 54 and the cylindrical member 52.

A cup-shape spring seat 57 is positioned on the extending end of the piston stem 54. The spring seat has a flange 58 that engages the end of a proportioning valve spring 59. The modulating piston 42 extends into the interior of the housing space 46 and has a reduced diameter end portion 61 which forms a shoulder. A spring retainer 62 is positioned on the piston shoulder. The spring seat 62 has a ledge 63 that engages the left end of the proportioning valve 59.

A flange 64 on the spring retainer 62 forms a spring seat that is engaged by a second spring 66. The opposite end of the spring 66 engages the right end of the housing interior 46.

A multi-diameter bore 47 in the housing 19, in combination with the cylindrical member 52, defines a proportioning valve chamber 70 to which the passage 48 is connected. A reduced diameter outlet chamber 71 is situated at the end of the chamber 70. The valve piston 53 has portions disposed in both chambers 70 and 71. The piston 53 has an enlarged portion 72 that is adjacent a smaller diameter portion 73 which, in turn, is situated adjacent a second enlarged portion 54. An elastomeric valve element 76 surrounds the smaller piston portion 73 and is located between the enlarged portions 72 and 74 of the valve piston 53. The elastomeric element 76 engages the wall of the bore 47 and the shoulder 77 situated between the chambers 70 and 71. Passages 78 are provided at the end of the piston 53 to assure communication for the flow of brake fluid from the outlet chamber 71 to the outlet port 49.

The elastomeric valve element 76 is positioned in engagement with the shoulder 77 and the wall of the bore 47. It is engageable with either the shoulder 79 of the large piston portion 72 or the rounded shoulder 81 of the piston portion 74 depending upon the axial position of the piston 53. The rounded shoulder 81 forms a valve head on the piston 53 and functions either to permit the unrestricted transmission of fluid pressure from the chamber 70 to the outlet chamber 71 and the outlet port 49 or to close the fluid passage and limit pressure at the outlet opening 49 with respect to the pressure in the chamber 70 (which is equal to master cylinder pressure). The latter is acccomplished by displacement of the piston 53 in response to the various fluid pressures and spring forces acting upon it.

The details of the construction of the elastomeric valve element 76 are shown in FIGS. 4 to 7. It will be seen that the valve element 76 has an extending lip 82, which in its free state is inclined angularly outwardly. When the valve element 76 is fitted in the bore 47, lip 82 is deflected radially inwardly slightly by the engagement of its outer periphery with the wall of the bore 47. This prevents the flow of fluid from the chamber 70 to the outlet chamber 71 outwardly around the lip 82. The outer periphery of the valve element 76, adjacent the lip 82, is provided with a plurality of circumferentially spaced apart axially extending ribs 83 of generally semi-cylindrical shape. The ribs 83 contact the wall of the bore 47.

The enlarged portion 72 of the piston 53 lies partly within the lip 82 and its shoulder 76 engages a plurality of spaced apart hemispherical bosses 84 projecting from the valve element 76. The outer diameter of the piston portion 72 is less than the inner diameter of the lip 82, thus permitting fluid to flow from the chamber 70, around the portion 72 and through the spaces between the bosses 84. The diameter of the reduced portion 73 of the piston 53 is less than the diameter of the inner peripheral surface 86 of the valve element 76 adjacent thereto so that an open fluid path exists from the spaces between the bosses 84 to the outlet chamber 71 and the outlet 49 when the piston 53 is disposed in the right-hand position illustrated in FIG. 3.

The downstream or right side of the valve element 76 is provided with a plurality of angularly spaced ribs 87 engageable with the housing shoulder 77 and in alignment with the ribs 83 to provide spaces therebetween for the return flow of fluid from the outlet chamber 71. By this means, fluid pressure at the outlet opening 49 can gain access to the outer periphery of the lip 82 so that if fluid pressure at the outlet 49 is higher than fluid pressure in the chamber 70 after valve closure, the outlet pressure can force the lip 82 radially inwardly for the reverse flow of fluid from the outlet 49 to the chamber 70 around the valve element 76.

It will be seen that the valve element 76 has a rounded valve seat 88 disposed at the right side of its inner peripheral surface 86. The valve seat 86 of element 76 is engageable with the valve head or shoulder 81 of the valve piston 53 upon movement of the piston 53 in an upstream or left-hand direction against the force exerted by the proportioning valve spring 59.

The proportioning valve chamber 70 is connected through passage 48 with chamber 24 and inlet port 23. The inlet port is connected to the master cylinder 12 which, in turn, is in communication with the front wheel brakes 15. Therefore, the fluid pressure in chamber 70 is at all times the same as master cylinder pressure, front brake pressure and inlet pressure.

OPERATION - PROPORTIONING VALVE

The proportioning valve 18 provides a path for the direct transmission of pressure from the inlet port 23 to the outlet port 49. This occurs around the periphery of the enlarged portion 72 of the piston 53 through the spaces between the bosses 84, through the annular gap between the valve seat 88 of valve element 76 and the valve head 81 of piston 53 and into the outlet chamber 71 which is in communication with the outlet port 49. This path remains open until the fluid pressure delivered to the proportioning valve chamber 70 attains a predetermined level known as the split point which is determined, in part, by the force exerted by the spring 59 on the piston 53.

The level of pressure at which the split point occurs in dependent upon the force of the spring 59 compared to the effective area of the piston 53 acted upon by fluid pressure in a direction opposing the force of the spring 59. This effective area is equal to the cross sectional area of the stem portion 54, inasmuch as the end of that portion is sealed off from the inlet fluid pressure by the seal 56 while fluid pressure acts against all of the remaining portions of the piston 53.

During the lower ranges of master cylinder pressure, the pressures in chamber 70 and 71 are equal because the fluid pressure acting on the effective area of the piston produces a force in an upstream or leftward direction that is insufficient to overcome the force of the spring 66. Assuming that $P_1$ equals the inlet fluid pressure in chamber 70, A equals the cross sectional area of the cylindrical stem portion 54, and S equals the force of the spring 66, then the piston 53 will close (that is, valve head 81 will move into engagement with seat 88) when $P_1A$ is greater than S.

When the valve head 81 closes against the valve member 76 in response to an increase in fluid pressure acting against the area A and the fluid pressure in the chamber 70 is further increased by the master cylinder 12, the increased level of fluid pressure will act against the piston 53 over an effective circular area having a diameter equal to the mean sealing diameter of the valve head 81 (hereafter called area B) less the area A. This produces a force on the piston 53 assisting the spring 59 and tending to reopen the piston 53 to deliver at least a portion of this increased fluid pressure to the outlet 49. It will be noted, however, that any of this increased fluid pressure delivered to the outlet chamber 71 and outlet passage 49 creates an opposing force on the piston 53 acting over the area B. This, of course, tends to reclose the piston 53 against the valve element 76.

These opposing forces tend to keep the valve head 81 closely adjacent to the valve seat 88 for the restricted flow of fluid from the proportioning valve chamber 70 to the outlet port 49 to create a pressure at the outlet which increases at a lower rate than the rate of increase in pressure in the chamber 70 during a pressure buildup by the master cylinder 12. The ratio of the pressures is determined by the relationship of the effective areas previously referred to. After the valve first closes (i.e. valve head 81 engages valve seat 88), the increase in inlet or master cylinder pressure (hereafter called $\Delta P_1$) will produce an increase in pressure at the outlet 49 (hereafter called $\Delta P_2$) in accordance with the following formula:

$$\Delta P_1 (B-A/B) = \Delta P_2$$

Similarly, if we assume $P_2$ is the pressure at the outlet port 49, then $P_2B = P_1 (B-A) + S$ after the valve piston 53 becomes operative. Accordingly, the fluid pressure existing at the front brakes 15 will be greater than the fluid pressure in the rear brakes 17 when the master cylinder pressure exceeds the pressure necessary to move the piston 53 against the force of the spring 66.

During that portion of a brake application in which the applied pedal effort is reduced subsequent to a brake application of sufficient intensity to have moved the valve piston 53 to its restricted flow position, $P_1$ acting on the area $B - A/B$ is reduced. Thus, the forces tending to move the piston 53 toward the outlet 49 are reduced and the piston 38 moves to the left (as seen in FIG. 3) under the influence of the pressure in the outlet chamber 71 acting on the area B. As the piston 53 moves to the left, the available volume for the fluid at the rear brake cylinders 17 is increased, thereby accomplishing a reduction in the pressure $P_2$. The piston 53 will continue its leftward movement in an effort to reduce the pressure $P_2$ to satisfy the previously mentioned formula:

$$P_2B = P_1(B-A) + S$$

However, the valve piston 53 will not completely achieve this result because of the limited possible travel thereof. During the reduction in inlet pressure, the pressure at the outlet port 49 can never be greater than the pressure in the chamber 70. This is because the fluid at the outlet 49 is able to flow around the valve element 76 and between the lip 82 and the wall of the bore 47 if the fluid pressure in the chamber 70 is at a lower level. The valve element 76 accordingly functions as a check valve to prevent rear brake pressure (the pressure in port 49 and outlet chamber 71) from ever being greater than front wheel or master cylinder pressure (the pressure in chamber 70).

When the pressure in the chamber 70 is reduced beneath the level at which the proportioning valve 18 originally closed, the valve piston 53 will be moved toward the outlet port 49 by the spring 59 to reopen the annular passage between the valve head 81 and the valve member seat 88.

In summary, the proportioning valve 18 provides direct communication between the inlet port 23 and the outlet port 49 until such time as the pressure buildup in chamber 70 reaches a predetermined value known as the split point. When the pressure exceeds the split point, the proportioning valve 18 operates to limit the pressure at the outlet port 49. More particularly, the proportioning valve 18 operates to limit the rate of pressure buildup at port 49 as the master cylinder pressure increases in the chamber 70 above the split point.

OPERATION - VALVE MODULATION

As previously explained, the brake valve 10 is interposed in the brake line between the master cylinder 12 and the rear brakes 17 of a motor vehicle brake system. It functions to limit the fluid pressure at the rear brakes 17 relative to the fluid pressure at the front brakes 15 when the master cylinder pressure exceeds a predetermined minimum amount. The brake valve 10 modulates that predetermined amount in accordance with the rate of vehicle deceleration. In addition, means are provided in the modulating means to compensate for dead time and vehicle lag.

During a brake application, the master cylinder 12 delivers fluid pressure to the front wheel brakes 15 and through the brake valve 10 to the rear brakes 17. During initial pressure buildup, the pressures in the front and rear brakes 15, 17 are substantially equal. As a predetermined master cylinder or inlet pressure (the split point), the proportioning valve 18 becomes operative to limit further increases in output pressure at the outlet 49.

The split point for the proportioning valve 18 is determined, in part, by the force of the spring 59. The pressure responsive modulating piston 42 provides a means for increasing the force exerted by the proportioning valve spring 59 on the valve piston 53 in response to the pressure in the chamber 44.

During the initial phase of most brake applications, the pressure in modulating pressure chamber 44 will be equal to master cylinder pressure. Referring to FIG. 1, the inlet 23, which is connected to the master cylinder 12, communicates through the bore 24, passages 29, 34 and 36 and pass the restrictive element 41 to the chamber 44. Limited clearance is provided between the element 41 and the wall of the bore 36 to permit fluid flow to the chamber 44. Assuming a brake application with a progressively increasing pressure at the inlet port 23, an equivalent increase in pressure will occur in the chamber 44 behind the modulating piston 42 and in the chamber 70 of the proportioning valve 18. As the pressure increases, the fluid pressure at the outlet 49 will equal the pressure at the inlet 23. The modulating piston 42 will remain stationary due to the force exerted on it by the coil spring 66.

When the fluid pressure in the proportioning valve chamber 70 reaches the split point, the proportioning valve 18 will become operative to limit further increases in pressure at the outlet 49 (i.e., valve head 81 will move toward the valve seat 88 to throttle fluid flow). As the master cylinder pressure increases, the pressure in chamber 44 behind modulating piston 42 will reach a level at which the piston will overcome the force of the coil spring 66 and will be displaced to the right. Spring 66 has a substantially greater spring rate than proportioning valve spring 59 and, therefore, it is the dominant force which must be overcome by the pressure in chamber 44 to permit displacement of the modulating piston 42.

The spring 66 provides a means for compensating for dead time. It assures a pressure buildup in the chamber 44 that exceeds the initial split point of the proportioning valve 18. This assures that the brake shoes are in full engagement with the brake drums prior to displacement of the modulating piston 42.

As the piston 42 is moved by the pressure buildup in chamber 44, the loading of spring 59 on the valve piston 53 of the proportioning valve 18 will be increased. This action will, in effect, increase the split point at which the proportioning valve 18 becomes effective to limit fluid pressure at the outlet 49. The modulating piston 42 is constructed to increase the split point of the proportioning valve 18 to a level that exceeds the inlet pressure. With each incremental increase in master cylinder pressure, the piston 42 will be displaced by an amount that increases the spring loading of the proportioning valve 18 to an extent that a new split is created which is above the increased master cylinder pressure. Therefore, when the modulating piston 42 is displaced by a given master cylinder pressure, it, in effect, disables the proportioning valve 18 for that same pressure.

Thus, the modulating piston 42 acting on the proportioning valve spring 59 provides a means for retarding the operation of the proportioning valve 18 in response to a buildup in inlet pressure. The pressure in the chamber 44 behind the modulating piston 52 is controlled by the restriction provided by the restrictive element 41 in the bore 36 and by the inertia weight 26 which carries the valve element 32. When a motor vehicle having the valve 10 is braked by the application of a force to the pedal 11, the vehicle will be decelerated. When that rate of deceleration reaches a predetermined minimum level, inertia forces will cause the weight 26 to be displaced to the left (as seen in FIG. 1) against the force of the spring 28 causing the valve element 32 to engage the shoulder 33 and seal the passage 29. As long as the valve element 32 is seated against the shoulder 33, any further increase in master cylinder pressure will be blocked from the chamber 44 behind the modulating piston 42, however, such pressure increases will be conveyed to the proportioning valve chamber 70. Therefore, when the weight 26 is displaced in response to the predetermined rate of deceleration the position of the piston 42 and the force exerted by the proportioning valve 18 will be stabilized. Therefore, the valve 18 will have a stabilized or fixed split point. Subsequent increases in master cylinder pressures will be above that stabilized split point and the proportioning valve 18 will thereafter restrict fluid pressure at the outlet 49.

It has been empirically determined that a deceleration rate of 0.4 G's for displacement of the inertia weight 26 provides optimum operation in a truck. When the vehicle having the valve 10 is decelerated at a rate less than 0.4 G's, the modulating piston 42 will be effective to retard the operation of the proportioning valve 18. However, if that vehicle has a rate of deceleration that exceeds 0.4 G's, passage 26 will be sealed by the valve element 32 on the weight 26 and the modulating piston 42 will cease to limit the functioning of the proportioning valve 18.

Because the rate of vehicle deceleration will depend, in part, upon the load carried by the vehicle, vehicle loading will be a factor in the operation of the inertia sensing weight 26.

Restrictive element 41 restricts the flow of fluid to the chamber 44 behind the modulating piston 42. Normally, pressure in the chamber 44 will be equal to inlet pressure or master cylinder pressure. As the pressure increases, a pressure buildup will also occur in chamber 44. If the increase in master cylinder or inlet pressure is at a moderate rate, then the restriction provided by the element 41 will limit pressure buildup in the chamber 44. Therefore, for moderate to high rates of pressure increase at the master cylinder 12 there will be a lag in pressure buildup in the chamber 44 behind the modulating piston 42.

Thus, with the brake valve 10 of this invention means are provided for lagging the pressure buildup in the chamber 44 behind the modulating piston 42 with respect to the pressure buildup in the chamber 70 of the proportioning valve 18. This feature compensates for vehicle lag. It prevents the modulating 42 from responding too quickly to an increase in master cylinder pressure before the vehicle begins to decelerate.

Referring to the graph of FIG. 8, the pressure at the valve inlet 23 ($P_1$) is plotted against the pressure at the valve outlet 49 ($P_2$). This is equivalent to a plot of the relative pressures at the front and rear brakes. The graph begins at an initial point 89 where all pressures are equal to zero. As the master cylinder pressure slowly increases, the front and rear pressures are increased in equal amounts until the master cylinder pressure reaches the initial split point which is indicated by reference numeral 90 on the graph. Subsequent increases in pressure at the inlet port 23 are accompanied by substantially lesser increases in pressure at the outlet port 49 as the proportioning valve 18 becomes operative. As the inlet pressure increases, the modulating piston 42 will overcome the force of spring 66 and will be displaced. Displacement of the piston 42 will increase the loading of the proportioning valve spring 59. The loading of spring 59 is increased an extent whereby the split point of the proportioning valve 18 is raised above the pressure in chamber 70.

With the pressure in chamber 70 below the new higher split point, the proportioning valve 18 will temporarily cease to function as a pressure limiting device. Thereafter, the pressure at outlet 49 will increase rapidly until it again becomes equivalent to inlet pressure.

This operation is illustrated in the graph. The portion of the graph between points 90 and 91 shows the pressure limiting operation of the proportioning valve 18. At point 91, pressure buildup behind piston 42 has reached a level that the force of spring 66 has been overcome and the modulating piston 42 has been displaced to an extent whereby the spring 59 is loaded so as to deactivate the proportioning valve 18. The portion of the curve between points 91 and 92 shows the pressure at the outlet 49 increasing to a point where it becomes equal to the pressure in inlet 23. From point 92 to point 93, the inlet and outlet or front and rear brake pressures are substantially equal.

The spring 66 delays the immediate actuation of the modulating piston 42 in response to a pressure buildup in chamber 44. This delay in the movement of the piston 42 compensates for dead time in the vehicle brake system. In the graph of FIG. 8, this is represented by the plateau between graph points 90 and 91. Regardless of vehicle loading, the proportioning valve has an initial split point 90 and the modulating piston 42 does not become operative to affect the operation of the proportioning valve 18 until the inlet pressure reaches a predetermined minimum point represented by graph point 91.

At point 93, pressure at the front and rear brakes will reach such a level that a fully loaded vehicle having the valve 10 will achieve a 0.4 G rate of vehicle deceleration. At that point the inertia sensitive weight 26 will move against the spring 32 and cause the seal element 32 to close the bore 29. Henceforth, the chamber 44 will be sealed off from the inlet 23 and no further increase in pressure will occur in chamber 44. The position of the piston 42 will be stabilized. Therefore, point 93 represents the maximum split point for the proportioning valve 18. Any subsequent increase in pressure at the inlet 23 and in the chamber 70 is limited at the outlet 49 by the proportioning valve 18. At inlet pressures above the point 93, the proportioning valve 18 resumes its function of limiting the pressure at the outlet 49 and at the rear brakes 17.

The curve containing the points 89, 90, 91, 92, 93 and 94 represents the relationship of front to rear brake pressure for a vehicle having a full load. In a vehicle that is unladen, a given pressure at the master cylinder 12 will cause the vehicle to decelerate at a greater rate than a fully loaded vehicle. In order to compensate for the fact that the rear wheels of the vehicle are carrying a substantially lesser load and, therefore, have a lower braking capability, means are provided for limiting the operation of the modulating piston 42 whose normal function it is to disable the proportioning valve 18.

In an unladen vehicle having the brake valve 10, a buildup in master cylinder pressure will produce a front to rear or $P_2$ to $P_1$ curve that passes through the points 89, 90 and 91. For the given master cylinder pressure, the unladen vehicle will decelerate at a higher rate which will cause the weight 26 to move to the left closing bore 29. The chamber 44 will be sealed off from the inlet 23. With the chamber 44 sealed off from further pressure increases, the position of the piston 42 will be stabilized. Therefore, further increases in pressure at the inlet 23 and in the chamber 70 will be met by a proportioning valve 18 that is operative to limit the pressure at the outlet 49. This is represented in the graph of FIG. 8 by the line passing through points 90, 91 and 95. In effect, the piston 42 will be prevented from increasing the split point of the proportioning valve 18 above the pressure at the inlet 23 by the inertia weight 26 and the valve element 32 coupled thereto. Before the pressure in chamber 44 can increase to the point where piston 42 will move against the force of spring 66, the chamber 44 will be sealed by the shifting of the weight 26. Therefore, the unladen vehicle represented by graph curve 89, 90, 91 and 95 will have only a single split point 90. There will be no second split point.

During a very rapid increase in brake line pressure as might occur during a spike stop, a pressure buildup in the chamber 44 might displace the piston 42 whereby the proportioning valve 18 would be disabled except for high master cylinder pressures. In the event this should happen in an unladen vehicle such as a truck, skidding of the rear brakes might occur. A lag occurs between a rapid buildup in brake line pressures and actual deceleration of the vehicle in a spike stop situation. Under this circumstance, the pressure might build up in the chamber 44 to displace the piston 42 before the inertia weight 26 would sense any vehicle deceleration. In order to compensate for this vehicle lag condition, the fluid flow restriction provided by member 41 is used to prevent a surge in brake line pressure from reaching the chamber 44. Due to the restriction, the fluid pressure can increase only gradually in chamber 44. Therefore, the modulating piston will not be displaced prematurely by a sudden increase in master cylinder pressure and the proportioning valve 18 will be operative to limit a rapid increase in pressure at the outlet 49 and at the rear brakes 17.

A spike stop in an unloaded vehicle would follow the curve 89, 90, 91, 95 due to the operation of the restrictive member 41 which prevents a rapid buildup of pressure in the chamber 44. Without the restrictive member 41, the valve would portion the pressure along the curve 89, 90, 91, 92, 93 before the inertia weight 26 would sense a 0.4 G rate of deceleration.

As a result of test work, it has been found desirable to select an inertia weight 26 and spring 28 combination such that the weight will be displaced when it senses a rate of vehicle deceleration equal to 0.4 G's. With such a construction, when the vehicle is braked and reaches a rate of deceleration of 0.4 G's, the chamber 44 will be sealed and further displacement of the modulating piston 42 will be prevented whereby further increase in master cylinder pressure and the pressure in chamber 70 will cause the proportioning valve 18 to become operative to limit the pressure at outlet 41. The restrictive flow member 41 provides a means for limiting the pressure increase in the chamber 44 prior to the achievement of an 0.4 G rate of deceleration whereby the phenomena of vehicle lag is compensated for.

The graph of FIG. 8 plots the inlet and outlet pressures or front to rear pressures for an unladen vehicle along the points 89, 90, 91, 95 and for a fully loaded vehicle along the points 89, 90, 91, 92, 93 and 95. A vehicle having only a partial load would exhibit a curve passing through points 89, 90 and 91 with the remainder of the curve intermediate the two lines through points 91, 95 and through points 93, 94. For the unladen vehicle, the proportioning valve 18 has a single split point indicated by point 90 on the curve. For a fully loaded vehicle, the proportioning valve 18 has an initial split point indicated by point 90 and a second split point indicated by graph point 93. For a partially loaded vehicle, the proportioning valve 18 would have an initial split point 90, would become deactivated at graph point 91 due to the displacement of piston 42 and then would have a second split point that would lie somewhere along the curve passing through points 91, 92 and 93. After the second split point, the curve for the partially loaded vehicle would be parallel to the two lines containing points 91, 95 and points 93, 94, respectively.

In summary, the present invention provides a brake valve for installation in a rear brake line to portion the fluid pressure at the rear brakes relative to the pressure at the front brakes. The valve includes a proportioning valve which limits the rear brake pressure after the master cylinder pressure reaches a split point. The valve includes disabling or modulating means that deactivates the proportioning valve by increasing its split point above the inlet pressure in response to a buildup in such pressure. An inertia sensitive device is arranged to deactivate the modulating means whereby the split point of the proportioning valve will be stabilized. The disabling or modulating means also include means for delaying its operation to compensate for dead time in the brake system. Means are further provided for compensating for vehicle lag by retarding the modulating means.

The brake valve 10 is adaptable to a brake system having a manually actuated master cylinder as seen in FIG. 2. It is intended, however, that the term "master cylinder" be considered as any source of brake fluid pressure, whether such pressure is generated manually or by a power means.

The foregoing description presents the presently preferred embodiment of this invention. Modifications and alterations may occur to those skilled in the art that will come within the scope and spirit of the following claims.

We claim:
1. A brake valve for a motor vehicle brake system,
   said brake valve having a pressure inlet constructed to be connected to a brake master cylinder and a pressure outlet constructed to be connected to a wheel brake,
   said brake valve having a housing with a proportioning valve operatively interposed between said inlet and said outlet,
   said proportioning valve having a proportioning valve element engaged by a proportioning valve spring constructed to limit a pressure increase at said outlet relative to a pressure increase at said inlet when the pressure at said inlet exceeds a split point pressure determined, in part, by the force exerted by a proportioning valve spring,
   a fluid chamber and communicating means connecting said chamber to said inlet,
   a modulating piston coupled to said proportioning valve spring and disposed, in part, in said chamber,
   said modulating piston being coaxial with said proportioning valve element,
   a second spring biasing said modulating piston at an at-rest position.
   said modulating piston being displaceable and constructed to increase said force exerted by said proportioning valve spring in response to said displacement of said modulating piston,
   said modulating piston being displaceable in response to fluid pressure in said chamber that exceeds a predetermined minimum pressure that is determined, in part, by the biasing force of said second spring on said piston,
   displacement of said modulating piston being constructed to cause an increase in the force exerted by said proportioning valve spring by said proportioning valve element whereby the effective split point pressure of said proportioning valve is increased,
   means constructed to compensate for brake system dead time,
   said just-mentioned means comprising said proportioning valve spring and said second spring cooperating to define an initial split point pressure for said proportioning valve that is less than said predetermined minimum pressure in response to which said modulating piston is displaceable whereby said proportioning valve will limit a pressure increase at said outlet when the pressure at said inlet is greater than said initial split point pressure but less than said predetermined minimum pressure,
   a linearly displaceable inertia weight having a valve element secured thereto and disposed in said communication means,
   said weight being displaceable in said housing along an axis that is parallel to and spaced apart from the axis of said modulating piston,
   said inertia weight and valve element being constructed to close the communication between said chamber and said inlet in response to a rate of vehicle deceleration that exceeds a predetermined minimum rate,
   said communication means including a passage and a plug fitted in said passage having an outside dimension slightly less than said passage,
   said passage and said plug cooperating to define an annular restrictive orifice,
   said annular restictive orifice being located between said inertia weight and valve element and said fluid chamber,
   said annular restrictive orifice being constructed to restrict the flow of fluid from said inlet to said chamber to limit the rate of increase in pressure in said chamber to compensate for vehicle lag.

* * * * *